UNITED STATES PATENT OFFICE.

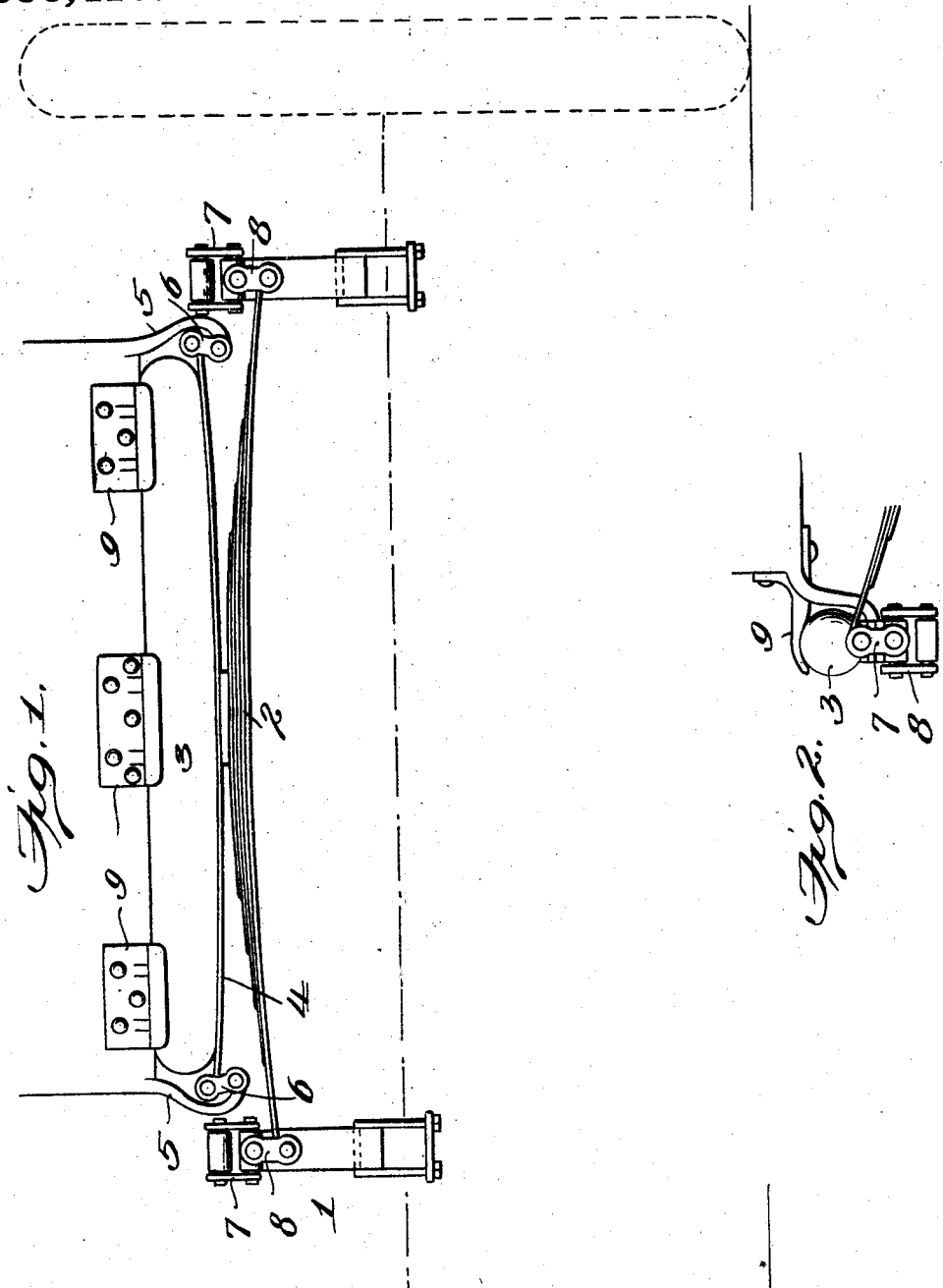

WALTER H. COOK, OF NEW ORLEANS, LOUISIANA.

SHOCK-ABSORBER FOR AUTOMOBILES.

1,058,413.

Specification of Letters Patent.

Patented Apr. 8, 1913.

Application filed September 10, 1912. Serial No. 719,662.

*To all whom it may concern:*

Be it known that I, WALTER H. COOK, a citizen of the United States, residing at New Orleans, in the parish of Orleans and State of Louisiana, have invented new and useful Improvements in Shock-Absorbers for Automobiles, of which the following is a specification.

This invention relates to improvements in shock absorbers of that general type wherein a cushioning means is employed in connection with a main spring to take up those vibrations which are beyond the capacity of the main spring to absorb and care for.

The improved shock absorber is to be arranged transversely of the vehicle and its elements are in coaction with the main springs at the side of the vehicle.

The object of the invention is to substantially eliminate or reduce to a minimum any side sway of the vehicle consequent to the action of the springs or shock absorbing agencies at the sides of the vehicle and the invention proposes a transverse main spring between which and the vehicle frame or body a cushioning agent is interposed and connections between the transverse main spring and the longitudinal main springs which will transmit the action of the latter to the former and, at the same time, will allow of all of said springs having the requisite freedom of motion. The invention does not entail any stiffening of the main springs beyond the strength required to properly carry their load and, consequently, the yielding action of said springs is unimpaired.

An embodiment of the invention is illustrated in the accompanying drawings, wherein:

Figure 1 is an elevation of the improved shock absorber as seen from the rear or the front of the vehicle frame or body; Fig. 2 is a detail side elevation showing the connections between the main springs at the side of the vehicle frame or body and the transverse main springs.

Similar characters of reference designate corresponding parts throughout the several views.

The main springs at the side of the vehicle are shown at 1 and the transverse main spring at 2. The spring 2 coacts with a cushioning agent, preferably, an elongated pneumatic tube 3, which bears against channeled brackets 9 secured to the vehicle frame or body or other equivalent parts of said frame or body. The tube 3 is transversely disposed, being substantially equal in length to the width of the vehicle and seats upon a transverse spring bar 4 which, in the instance disclosed, is secured at its central portion to the central portion of the spring 2. The support for the bar 4 comprises brackets 5 which depend from the frame or body of the vehicle and links 6, which connect said brackets and the ends of the bar 4.

The connections between the ends of the spring 2 and the adjacent ends of the springs 1 comprise links 7 which are pivoted transversely at the ends of the springs 1, so as to swing in the plane of said springs from which they hang, and links 8 which are pivoted at the lower ends of the links 7 on axes which are at right angles to the pivots of the latter, so as to swing in the plane of the spring 2. The links 8 are pivotally connected at their lower ends to the adjacent ends of the spring 2. The links 7 and 8 thus form substantially universal connections between the adjacent ends of the springs 1 and 2 and, while transmitting the pulsations of the springs 1 to the spring 2, allow of all of the said springs having the requisite freedom of play.

The bar 4 constitutes an element for transmitting vibrations to the cushion 3, and itself absorbs some of the shocks, thus minimizing the intensity and recurrence of the final vibrations which are taken care of by the element 3. Where the cushioning element comprises an elongated pneumatic tube, as in the embodiment disclosed, a somewhat wave-like compression of the cushion 3 from the center outward is obtained, and the action of the device is thus rendered sensitive and responsive. It is obvious that if there is any inequality in the action of the springs 1, such as would produce a side sway of the body of the vehicle, such inequality is compensated for by the construction herein described.

The present shock absorber not only compensates for inequality in the action of the side springs, and thereby improves the riding qualities of the vehicle, but it continuously relieves said springs of a substantial proportion of the stresses and, consequently, prolongs the life of the vehicle suspension.

Having fully described my invention, I claim:

1. In a shock absorber, the combination with main springs at the sides of the vehicle, of a transverse main spring, universal joint means to suspend the transverse spring from the side springs, a cushioning element which takes a bearing against the frame of the vehicle, and a shock transmitting element in the form of a transverse spring bar which works between the transverse spring and the cushioning element.

2. In a shock absorber, the combination with main springs at the sides of the vehicle, of a transverse main spring, universal joint means to suspend the transverse spring from the side springs, a cushioning element which takes a bearing against the frame of the vehicle, and a shock transmitting element comprising a transverse spring bar secured at its center to the transverse spring and at its ends to the frame of the vehicle, the bar working between the transverse spring and the cushioning element.

3. In a shock absorber, the combination with main springs at the sides of the vehicle, of a transverse main spring, universal joint means to suspend the transverse spring from the side springs, a cushioning element which takes a bearing against the frame of the vehicle, a shock transmitting element which works between the transverse spring and the cushioning element, the shock transmitting element comprising a transverse spring bar secured at its center to the transverse spring, and links connecting the ends of said spring bar and the frame of the vehicle.

4. In a shock absorber, the combination with main springs at the sides of the vehicle, of a transverse main spring, universal joint means to suspend the transverse spring from the side springs and comprising a pair of pivotally connected links at each end of the transverse spring, the upper links hanging from the side springs and being movable in the plane of the latter and the lower links being movable in the plane of the transverse spring, a cushioning element which takes a bearing against the frame of the vehicle, a shock transmitting element which works between the transverse spring and the cushioning element, the shock transmitting element comprising a transverse spring bar secured at its center to the transverse spring, and links connecting the ends of said spring bar and the frame of the vehicle.

5. In a shock absorber, the combination with main springs at the sides of the vehicle, of a transverse main spring, universal joint means to suspend the transverse spring from the side springs, a cushioning element comprising a transverse elongated pneumatic tube which takes a bearing against the frame of the vehicle, and a shock transmitting element comprising a transverse spring bar which receives the impulses of the transverse spring and forms a seat for the tube.

6. In a shock absorber, the combination with main springs at the sides of the vehicle, of a transverse main spring, universal joint means to suspend the transverse spring from the side springs, a cushioning element comprising a transverse elongated pneumatic tube which takes a bearing against the frame of the vehicle, a transverse spring bar secured at its center to the transverse spring, and links connecting the ends of the spring bar and the vehicle frame, the spring bar forming a seat for the tube.

7. In a shock absorber, the combination with main springs at the sides of the vehicle, of a transverse main spring, universal joint means to suspend the transverse spring from the side springs and comprising a pair of pivotally connected links at each end of the transverse spring, the upper links hanging from the side springs and being movable in the plane of the latter and the lower links being movable in the plane of the transverse spring, a cushioning element comprising a transverse elongated pneumatic tube which takes a bearing against the frame of the vehicle, and a shock transmitting element comprising a transverse spring bar which receives the impulses of the transverse spring and forms a seat for the tube.

8. In a shock absorber, the combination with main springs at the sides of the vehicle, of a transverse main spring, universal joint means to suspend the transverse spring from the side springs and comprising a pair of pivotally connected links at each end of the transverse spring, the upper links hanging from the side springs and being movable in the plane of the latter and the lower links being movable in the plane of the transverse spring, a cushioning element comprising a transverse elongated pneumatic tube which takes a bearing against the frame of the vehicle, a transverse spring bar secured at its center to the transverse spring, and links connecting the ends of the spring bar and the vehicle frame, the spring bar forming a seat for the tube.

In testimony whereof I have hereunto set my hand in presence of two subscribing witnesses.

WALTER H. COOK.

Witnesses:
Thomas R. Richardson,
Robert Waterman.